(12) United States Patent
Kim et al.

(10) Patent No.: US 8,952,790 B2
(45) Date of Patent: Feb. 10, 2015

(54) STRONG PASSIVE AD-HOC RADIO-FREQUENCY IDENTIFICATION

(76) Inventors: Moon J. Kim, Wappingers Falls, NY (US); Bonwoong Koo, Los Altos, CA (US)

( * ) Notice: Subject to any disclaimer, the term of this patent is extended or adjusted under 35 U.S.C. 154(b) by 489 days.

(21) Appl. No.: 12/949,033

(22) Filed: Nov. 18, 2010

(65) Prior Publication Data
US 2012/0126945 A1 May 24, 2012

(51) Int. Cl.
*H04Q 5/22* (2006.01)
*G06K 7/10* (2006.01)

(52) U.S. Cl.
CPC ........ *G06K 7/10188* (2013.01); *G06K 7/10237* (2013.01)
USPC ........................ 340/10.34; 340/7.32; 340/7.36

(58) Field of Classification Search
CPC ............ G06K 7/0008; G06K 19/0723; G06K 19/0701; G06K 19/0672; G06K 19/0705; G06K 19/07749; G06K 2017/0045; G06K 7/10237; G06K 7/10188; G06K 7/01; G07C 9/00111; B61L 25/043
USPC ............ 340/10.1, 10.33, 10.34, 10.51, 10.52, 340/572.1, 572.8, 7.32, 7.36; 329/341; 342/42, 51; 455/343.1
See application file for complete search history.

(56) References Cited

U.S. PATENT DOCUMENTS

| | | | |
|---|---|---|---|
| 6,294,953 B1 * | 9/2001 | Steeves | .......................... 329/341 |
| 7,374,105 B2 | 5/2008 | Zhu et al. | |
| 7,443,299 B2 | 10/2008 | Forster | |
| 7,515,049 B2 | 4/2009 | Sharma et al. | |
| 7,659,821 B2 | 2/2010 | Kim et al. | |
| 7,786,868 B2 | 8/2010 | Forster | |
| 2006/0103535 A1 * | 5/2006 | Pahlaven et al. | ........... 340/572.1 |
| 2006/0202032 A1 | 9/2006 | Kricorissian | |
| 2007/0194936 A1 * | 8/2007 | Hoshina | ..................... 340/572.8 |
| 2007/0262849 A1 * | 11/2007 | Ismail | .......................... 340/10.1 |
| 2007/0285244 A1 | 12/2007 | Tucker et al. | |
| 2008/0180249 A1 | 7/2008 | Butler et al. | |
| 2009/0085750 A1 | 4/2009 | Waldner et al. | |
| 2009/0289773 A1 | 11/2009 | Hoyt et al. | |
| 2010/0201488 A1 | 8/2010 | Stern et al. | |

* cited by examiner

*Primary Examiner* — Omer S Khan
(74) *Attorney, Agent, or Firm* — Hunter E. Webb; Keohane & D'Alessandro PLLC

(57) ABSTRACT

Embodiments of the present invention provide a strong passive ad-hoc radio-frequency identification (RFID) network (the "network). The network typically includes an RFID receiver and N quantity of RFID tags coupled to one another. For example, a network under the present invention can include an RFID reader; a first RFID tag in communication with the RFID reader; and a second RFID tag in communication with the first RFID tag. The first RFID tag and the second RFID tag will have passive capacitance to allow them to store energy and data. In this example, the first RFID tag can be enabled to behave as an RFID reader. Moreover, the first RFID tag is positioned within a first field generated by the RFID reader, while the second RFID tag being in a second field generated by the first RFID tag, the second field generated using the energy stored in the first RFID tag. This type of tag to tag coupling/communication arrangement can continue for a number of tags. Not only does this allow for communication around physical obstacles, but it allows any RFID tag to be configured to perform a synchronized reader operation with the RFID reader.

8 Claims, 3 Drawing Sheets

STRONG PASSIVE AD-HOC RADIO-FREQUENCY IDENTIFICATION

FIELD OF THE INVENTION

The present invention generally relates to RFID technology. Specifically, the present invention relates to a strong passive ad-hoc RFID network.

BACKGROUND OF THE INVENTION

Over recent years, RFID has become an increasing function of providing wireless communications. For example, RFID is commonly implemented in security devices (e.g., swipers and/or card readers) for businesses as well as in many other areas. Unfortunately, RFID is typically passive and has its range limited by distance and physical obstacles. Moreover, RFID reader power is limited by regulation, which causes range issues since RFID operational range is constrained by the available power. As such, RFID reliability and responsiveness are commonly compromised in practical environments. In view of the foregoing, there exists a need to extend RFID range within the given power limit while still remaining as a passive RFID. The related art has failed to provide such functionality, including those references listed below:

U.S. Pat. No. 7,786,868 discloses an RFID device with multiple passive operation modes that are fully passive or boosted passive. The boosted passive mode utilizes an internal energy booster. The energy booster may include a one-port transistor and an energy source that is used to power the transistor.

U.S. Pat. No. 7,443,299 discloses an extended range RFID system for discs such as CDs, DVDs, or minidiscs. A special RFID transponder and antenna configuration is used and antenna elements are coupled to the transponder extending in opposite directions across an outer annular zone. The monopole or dipole mode of antenna operation (utilizing a metalized disc layer) results from this antenna configuration and is stated as "to more than double the range of the system".

U.S. Pat. No. 7,374,105 discloses an RFID tag having an RFID integrated circuit and an antenna that are combined with a first passive antenna circuit to provide an extended operating range. The second passive antenna circuit is essentially identical to the first antenna, only it has larger dimensions, and is positioned with the coil of the second passive antenna circuit surrounding the first coil to extend the operating range.

U.S. Patent Application 20090289773 discloses a method for extending the read range of passive RFID tags. Excess excitation energy is dissipated through circuitry for a constant current power supply that is implemented either with discrete components integrated into the ASIC design, a network that minimizes the amount of energy that is converted to heat by a traditional configuration's shunt regulator, and/or a sleep mode for reducing the energy consumed by an RFID tag after it has been read.

U.S. Patent Application 20090085750 discloses an extended RFID tag. The extended range RFID tag includes a UHF RFID tag having a dipole antenna attached to a surface of a substrate and further includes an antenna extension that overlaps a portion of the dipole antenna for electromagnetically coupling the antenna extension and the dipole antenna when in operation.

U.S. Patent Application 20070285244 discloses a long range RFID transponder. The improved range is achieved through the RFID power generation's Passive Magnetostrictive Electroactive device component. One example includes a passive magnetic field sensor made of layers of Terfenol-D magnetostrictive material and ceramic PXT-5 to act as a generator to power the RFID when in range of the querying transceiver magnetic field.

U.S. Pat. No. 7,659,821 discloses a smart RFID infrastructure and method that enables communication between RFID tags. Information tables from individual RFID tags are aggregated into master information tables on writeable RFID tags.

U.S. Pat. No. 7,515,049 discloses an extended read range RFID system. This system utilizes an apparatus to extend the reader's antenna signal to a location proximate to the RFID tag. In another embodiment, the apparatus utilizes at least one magnetic rod to create a magnetic path for the RF field to travel between the reader's antenna and the RFID tag.

U.S. Patent Application 20100201488 discloses a system for displaying read range of a RFID reader based upon feedback from fixed RFID beacon tags. An interrogation signal is transmitted from the RFID reader to these fixed RFID beacon tags at known locations.

U.S. Patent Application 20060202032 discloses an automatic identification and data capture system.

Among other things, none of these references teach a strong passive ad-hoc RFID network whereby RFID tags can store energy or data, and/or (wirelessly) couple to and communicate with one another.

SUMMARY OF THE INVENTION

In general, embodiments of the present invention provide a strong passive ad-hoc radio-frequency identification (RFID) network (the "network). The network typically includes an RFID receiver and N quantity of RFID tags coupled to one another. For example, a network under the present invention can include an RFID reader; a first RFID tag in communication with the RFID reader; and a second RFID tag in communication with the first RFID tag. The first RFID tag and the second RFID tag will have passive capacitance to allow them to store energy and data. In this example, the first RFID tag can be enabled to behave as an RFID reader. Moreover, the first RFID tag is positioned within a first field generated by the RFID reader, while the second RFID tag being in a second field generated by the first RFID tag, the second field is generated using the energy stored in the first RFID tag. This type of tag to tag coupling/communication arrangement can continue for a number of tags. Not only does this allow for communication around physical obstacles, but it allows any RFID tag to be configured to perform a synchronized reader operation with the RFID reader.

A first aspect of the present invention provides a strong passive ad-hoc radio-frequency identification (RFID) network, comprising: an RFID reader; a first RFID transponder in communication with the RFID reader; and a second RFID transponder in communication with the first RFID transponder, the first RFID transponder and the second RFID transponder having passive capacitance to allow the first RFID transponder and the second RFID transponder to store energy.

A second aspect of the present invention provides a strong passive ad-hoc radio-frequency identification (RFID) network, comprising: an RFID reader; a first RFID transponder in communication with the RFID reader, the first RFID transponder being positioned in a field generated by the RFID reader; a second RFID transponder in communication with the first RFID transponder, the second RFID transponder being positioned in a field generated by the first RFID transponder; and wherein the first RFID transponder and the second RFID transponder has passive capacitance to allow the first RFID transponder and the second RFID transponder to store energy.

A third aspect of the present invention provides a method for creating strong passive ad-hoc radio-frequency identification (RFID) network, comprising: establishing wireless communication between a first RFID transponder and an RFID reader; and establishing wireless communication between a second RFID transponder and the first transponder to create the strong passive ad-hoc RFID network, the first RFID transponder and the second RFID transponder having passive capacitance to allow the first RFID transponder and the second RFID transponder to store energy.

BRIEF DESCRIPTION OF THE DRAWINGS

These and other features of this invention will be more readily understood from the following detailed description of the various aspects of the invention taken in conjunction with the accompanying drawings in which.

Figure 1:
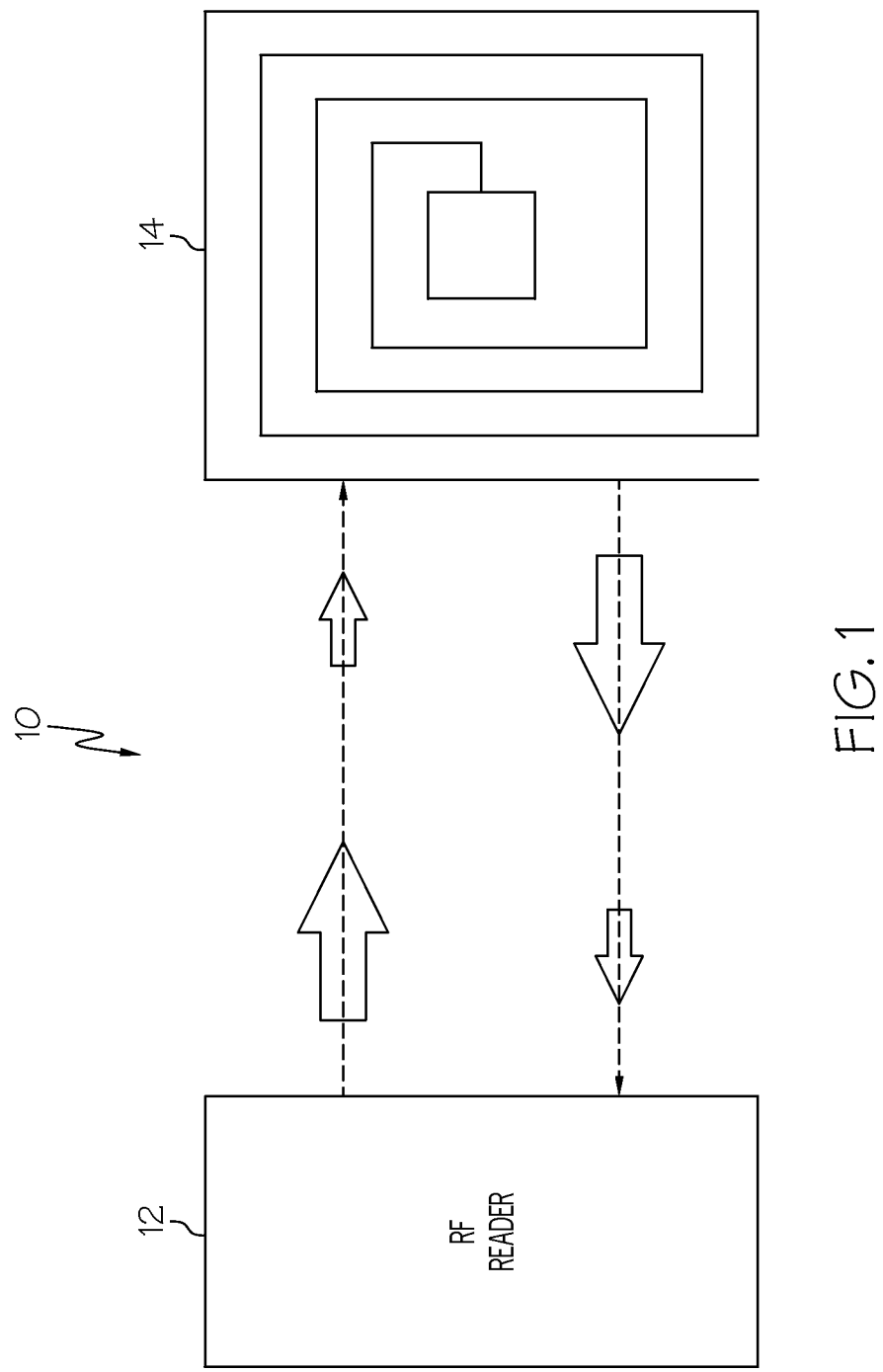
FIG. 1 depicts an RFID configuration according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide a strong passive ad-hoc radio-frequency identification (RFID) network (the "network). The network typically includes an RFID receiver and N quantity of RFID tags coupled to one another. For example, a network under the present invention can include an RFID reader; a first RFID tag in communication with the RFID reader; and a second RFID tag in communication with the first RFID tag. The first RFID tag and the second RFID tag will have passive capacitance to allow them to store energy and data. In this example, the first RFID tag can be enabled to behave as an RFID reader. Moreover, the first RFID tag is positioned within a first field generated by the RFID reader, while the second RFID tag being in a second field generated by the first RFID tag, the second field generated using the energy stored in the first RFID tag. This type of tag to tag coupling/communication arrangement can continue for "N" number of tags. Not only does this allow for communication around physical obstacles, but it allows any RFID tag to be configured to perform a synchronized reader operation with the RFID reader.

In general, RFID is a technology that incorporates the use of electromagnetic or electrostatic coupling in the radio frequency (RF) portion of the electromagnetic spectrum to uniquely identify an object, animal, or person. RFID is coming into increasing use in the industry as an alternative to the bar code. The advantage of RFID is that it does not require direct contact or line-of-sight scanning. An RFID system consists of three components: an antenna and transceiver (often combined into one reader) and a transponder (the tag). The antenna uses radio frequency waves to transmit a signal that activates the transponder. When activated, the tag transmits data back to the antenna. The data is used to notify a programmable logic controller that an action should occur. The action could be as simple as raising an access gate or as complicated as interfacing with a database to carry out a monetary transaction. Low-frequency RFID systems (e.g., 30 KHz to 500 KHz) have short transmission ranges (generally less than six feet). High-frequency RFID systems (850 MHz to 950 MHz and 2.4 GHz to 2.5 GHz) offer longer transmission ranges (more than 90 feet). RFID is sometimes called dedicated short range communication (DSRC).

RFID tags and labels (collectively referred to herein as "devices" or transponders) are widely used to associate an object with an identification code or other information. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels. As noted above, RFID devices are generally categorized as labels or tags. RFID labels are RFID devices that are adhesive or otherwise have a surface attached directly to objects. RFID tags, in contrast, are secured to objects by other means (for example, by use of a plastic fastener, string or other fastening means).

RFID devices include: (1) active tags and labels, which include a power source for broadcasting signals; and (2) passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and communicate enough information to uniquely identify individuals, packages, inventory, and the like. RFID tags and labels also can be characterized as to those to which information is written only once (although the information may be read repeatedly), and those to which information may be written to repeatedly during use. For example, RFID tags may store environmental data (that may be detected by an associated sensor), logistical histories, state data, etc.

Along these lines, RFID devices can be further characterized as passive, semi-passive, and active RFID devices. Passive RFID devices have no internal power supply. Power for operation of passive RFID devices is provided by the energy in an incoming radio frequency signal received by the device. Most passive RFID devices signal by backscattering the carrier wave from an RF reader. Passive RFID devices have the advantage of simplicity and long life, although performance of them may be limited. In general, the teachings recited herein pertain to passive RFID technology Referring now to FIG. 1, an illustrative RFID configuration according to the present invention is shown. As depicted, configuration 10 shows an RFID transceiver/reader 12 communicating with RFID transponder 14. Transponder 14 can be any type of RFID transponder now known or later developed. Examples include the aforementioned labels and/or tags. As further shown, RFID reader 12 and RFID transponder 14 will exchange data (e.g., security information, etc.). Under the present invention, these types of components will be leveraged to create a strong passive ad-hoc RFID network that is (among other things) capable of communicating over longer distances, and around physical objects.

Figure 2:
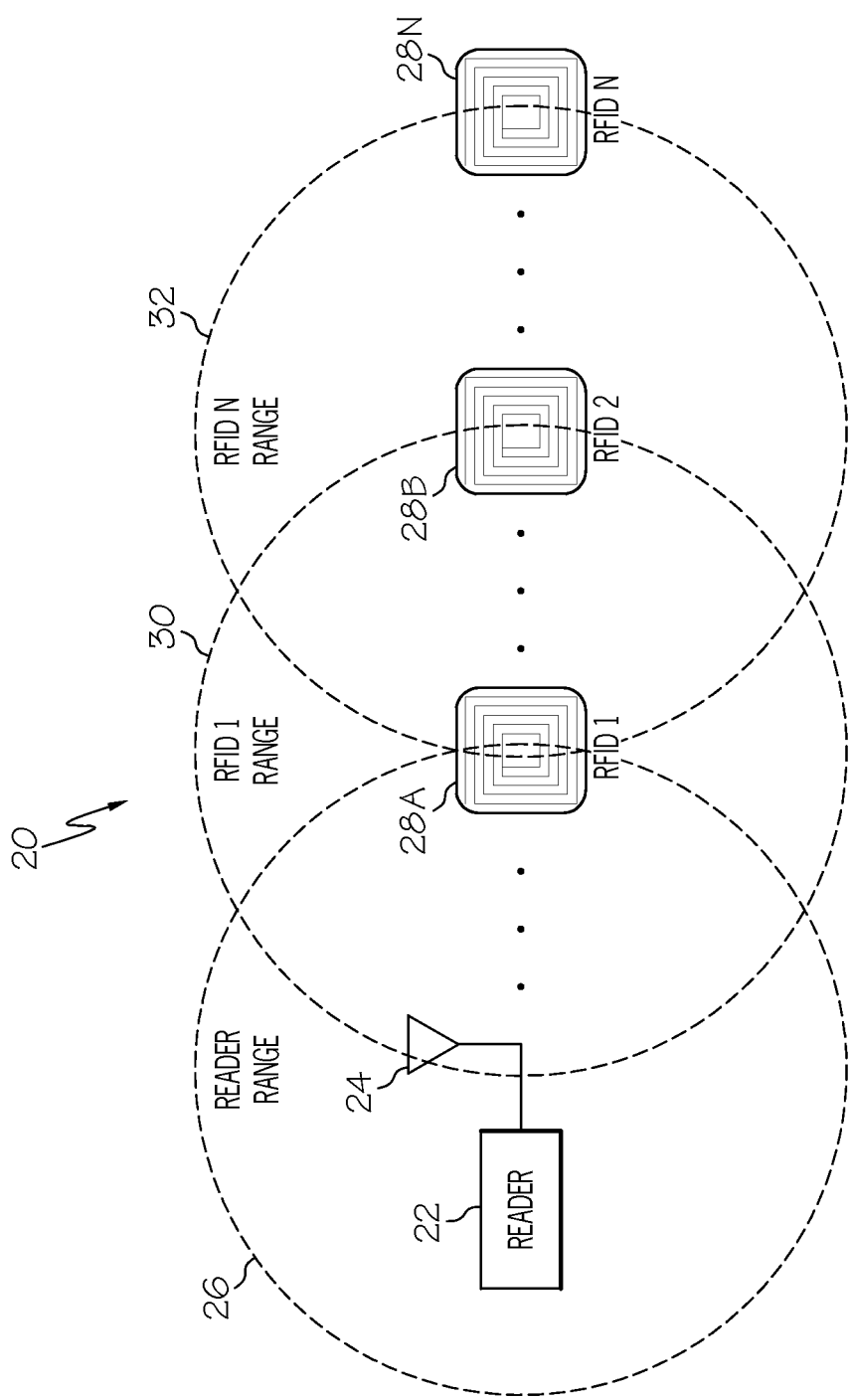
FIG. 2 depicts a strong passive ad-hoc RFID network according to an embodiment of the present invention.

Referring now to FIG. 2, a strong passive ad-hoc RFID network (network 20) is shown. As depicted, network 20 comprises RFID reader 22 having an antenna 24 that generates a (e.g., magnetic) field 26. By positioning RFID transponder 28A in field 26, wireless communication between transponder 28A and reader 22 is established. Under the present invention transponder 28A has passive capacitance to allow it to store energy and data and generate its own field 30. In so doing, another RFID transponder 28B can be positioned in field 30 and placed in wireless communication with transponder 28A. Similar to transponder 28A, transponder 28N also has passive capacitance that allows it to store energy and data and to generate a field 32 of its own. This type of arrangement effectively allows "N" number of RFID transponders 28N to be placed in wireless communication with one another. That is, the storage of energy allow RFID signal strength and range to be greatly extended.

Figure 3:
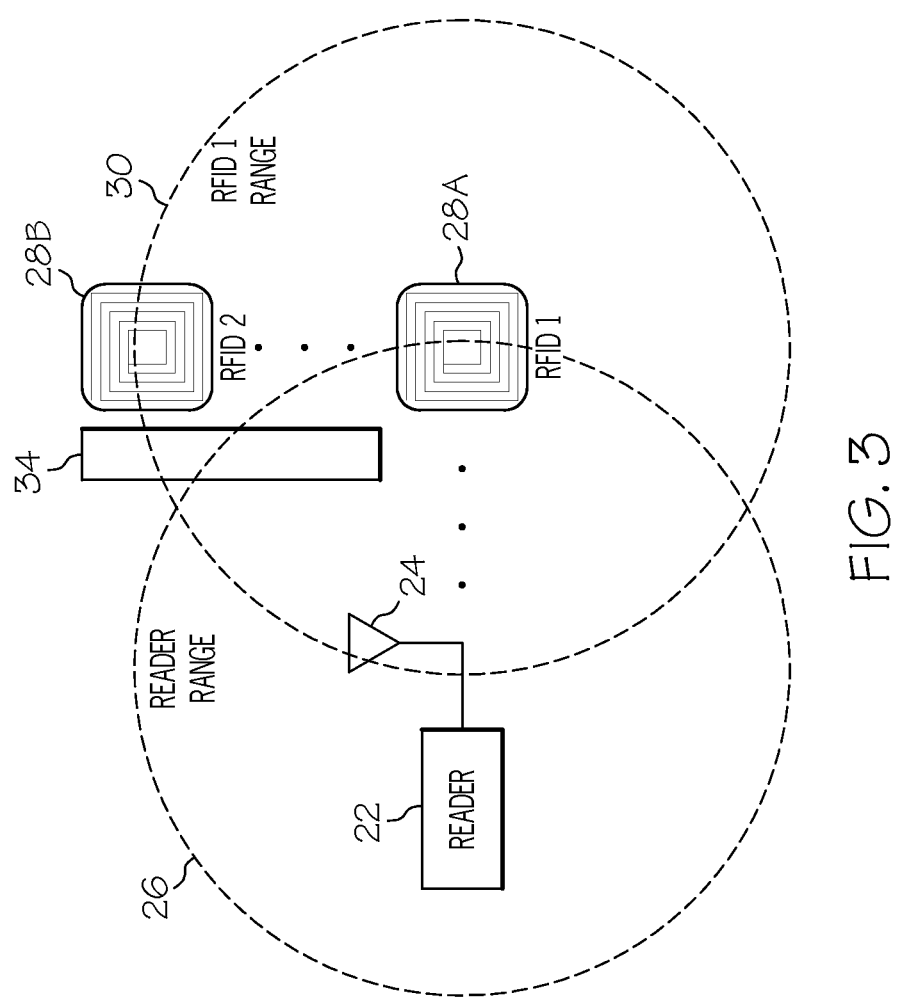
FIG. 3 depicts the strong passive ad-hoc RFID network of FIG. 2 as used to circumvent a physical object according to an embodiment of the present invention.

In addition, the energy/data storage functions recited herein further allow RFID transponders 28A-N to: be enabled to behave as an RFID reader; be configured to perform a synchronized reader operation with the RFID reader; and be configured to communicate around physical obstacles. An example of the latter is shown in FIG. 3. It is understood that although only two RFID transponders 28A-B are shown in FIG. 3, the same concept could be applied across any quantity of RFID transponders. Regardless, similar to FIG. 2, RFID transponder 28A is positioned in field 26 generated by antenna 24 of RFID reader 22. As indicated, this establishes wireless communication between reader 22 and transponder 28A, which leverages the passive capacitance of RFID tag 28A to foster the energy and data transfer and storage between the reader 22 and 28A. When a physical object 34 is in the way, transponder 28B can be placed at varying angles within field 30 to foster communication around the object.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A strong passive ad-hoc radio-frequency identification (RFID) network, comprising:
    an RFID reader; and
    a plurality of passive RFID transponders that operate independently of one another and are similarly configured to: when inside of a first field generated by the RFID reader, communicate with the RFID reader directly and to generate a second field that is consistent with the first field utilizing energy from the first field and, when outside of the first field generated by the RFID reader, communicate with the RFID reader and communicate with others of the plurality of passive RFID transponders via the second field and to generate a third field that is consistent with the first field utilizing energy from the second field, wherein the plurality of passive RFID transponders comprise:
        a first RFID transponder in direct communication with the RFID reader using the energy received from an incoming radio frequency signal from the first field generated by the RFID reader, where the first RFID transponder produces a first RFID transponder transmitted radio frequency signal from the radio frequency signal of the RFID reader to generate the second field; and
        a second RFID transponder, the second RFID transponder located outside of a field of communication with the RFID reader, the second RFID transponder in communication with the first RFID transponder using energy received from the second field generated by the first RFID transponder transmitted radio frequency signal, the first RFID transponder and the second RFID transponder having passive capacitance to allow the first RFID transponder and the second RFID transponder to store energy and data;
        wherein the first RFID transponder is positioned in a the first field generated by the RFID reader, and the second RFID transponder is positioned in the second field generated by the first RFID transponder, the second field generated using the energy stored in the first RFID transponder conserved from the energy from the first field; and
        wherein the second RFID transponder is configured to receive communications from the first RFID transponder by deriving energy from the second field, and the second RFID transponder is configured to send communications to the first RFID transponder by deriving energy from the second field;
        a third RFID transponder positioned in the third field generated by the second RFID transponder, the third field generated by the second RFID transponder being generated using the energy stored in the second RFID transponder conserved from the energy from the second field.

2. The strong passive ad-hoc RFID network of claim 1, the first RFID transponder being enabled to behave as a second RFID reader.

3. The strong passive ad-hoc RFID network of claim 1, the plurality of RFID transponders in the strong passive ad-hoc RFID network being further configured to perform a synchronized reader operation with the RFID reader.

4. The strong passive ad-hoc RFID network of claim 1, the strong passive ad-hoc RFID network being configured to communicate around physical obstacles.

5. A strong passive ad-hoc radio-frequency identification (RFID) network, comprising:
- an RFID reader;
- a plurality of passive RFID transponders that operate independently of one another and are similarly configured to:
  - when inside of a first field generated by the RFID reader, communicate with the RFID reader directly and to generate a second field that is consistent with the field generated by the RFID reader utilizing energy from the field generated by the RFID reader and, when outside of the first field generated by the RFID reader, communicate with the RFID reader and communicate with others of the plurality of passive RFID transponders via the second field and to generate a third field that is consistent with the first field generated by the RFID reader utilizing energy from the second field, wherein the plurality of passive RFID transponders comprise:
    - a first RFID transponder in communication with the RFID reader, the first RFID transponder being positioned in the first field generated by the RFID reader, wherein the first RFID transponder receives energy from said first field generated by the RFID reader and produces a first RFID transponder transmitted radio frequency signal from said received energy to generate the second field; and
    - a second RFID transponder, the second RFID transponder located outside of a field of communication with the RFID reader, the second RFID transponder configured to send at least one communication to the first RFID transponder, the second RFID transponder configured to receive at least one communication from the first RFID transponder, the second RFID transponder being positioned in the second field generated by the first RFID transponder, the second field generated by the first RFID transponder being generated using the energy stored in the first RFID transponder conserved from the energy from the first field;
    - wherein the second RFID transponder receives energy from said second field generated by the first RFID transponder enabling the sending of the at least one communication to the first RFID transponder and the receiving of the at least one communication from the first RFID transponder;
    - wherein the first RFID transponder and the second RFID transponder has passive capacitance to allow the first RFID transponder and the second RFID transponder to store energy and data;
    - a third RFID transponder positioned in the third field generated by the second RFID transponder, the third field generated by the second RFID transponder being generated using the energy stored in the second RFID transponder conserved from the energy from the second field.

6. The strong passive ad-hoc RFID network of claim 5, the first RFID transponder being enabled to behave as a second RFID reader.

7. The strong passive ad-hoc RFID network of claim 5, the plurality of RFID transponders in the strong passive ad-hoc RFID network being configured to perform a synchronized reader operation with the RFID reader.

8. The strong passive ad-hoc RFID network of claim 5, the strong passive ad-hoc RFID network being configured to communicate around physical obstacles.

* * * * *